United States Patent
Kumar et al.

[11] Patent Number: 5,936,691
[45] Date of Patent: Aug. 10, 1999

[54] METHOD OF PREPARING ALIGNMENT LAYER FOR USE IN LIQUID CRYSTAL DEVICES USING IN-SITU ULTRAVIOLET EXPOSURE

[75] Inventors: Satyendra Kumar; Jae-Hoon Kim, both of Kent, Ohio

[73] Assignee: Kent State University, Kent, Ohio

[21] Appl. No.: 09/118,396

[22] Filed: Jul. 17, 1998

[51] Int. Cl.[6] .................................................. G02F 1/1337
[52] U.S. Cl. ........................................ 349/124; 349/125
[58] Field of Search .................................. 349/123, 124, 349/125, 132, 134

[56] References Cited

U.S. PATENT DOCUMENTS

| | | | |
|---|---|---|---|
| 5,604,615 | 2/1997 | Iwagoe et al. | 349/124 |
| 5,623,354 | 4/1997 | Lien et al. | 349/132 |
| 5,756,649 | 5/1998 | Mizushima et al. | 349/123 |
| 5,786,041 | 7/1998 | Takenaka et al. | 349/134 |

OTHER PUBLICATIONS

Kobayashi et al., New Development in Alignment Layers for Active Matrix TN–LCDs, IDRC (Oct. 11, 1994), pp. 78–85.
Hasegawa et al., Nematic Homogeneous Alignment by Photo Depolymerization of Polyimide, IDRC (Oct. 11, 1994), pp. 213–216.
Schadt et al., Photo–Induced Alignment and Patterning of Hybrid Liquid Crystalline Polymer Films on Single Substrates, Jpn. J. Appl. Phys., vol. 34, Part 2, No. 6B (Jun. 15, 1995), pp. 764–767.

*Primary Examiner*—William L. Sikes
*Assistant Examiner*—Dung Nguyen
*Attorney, Agent, or Firm*—Renner, Kenner, Greive, Bobak, Taylor & Weber

[57] ABSTRACT

A non-contacting method of forming an alignment layer on a substrate used in liquid crystal displays which includes the steps of cleaning a substrate surface, disposing a solution having a prepolymer, such as polyamic acid or a resin and a curing agent, and solvent on the substrate surface, evaporating the solvent, and positioning an ultraviolet light source proximally near the substrate surface. A linear polarizer is positioned between the ultraviolet light source and the substrate surface. Ultraviolet light is projected through the polarizer onto the substrate surface to simultaneously molecularly align the polymer segments as the prepolymer is polymerized to form an alignment layer on the substrate. Adjusting the direction of polarization and the angle of incidence of the ultraviolet light source allows for generation of an alignment layer with a corresponding pre-tilt angle.

20 Claims, 3 Drawing Sheets

METHOD OF PREPARING ALIGNMENT LAYER FOR USE IN LIQUID CRYSTAL DEVICES USING IN-SITU ULTRAVIOLET EXPOSURE

GOVERNMENT RIGHTS

The United States Government has a paid-up license in this invention and may have the right in limited circumstances to require the patent owner to license others on reasonable terms as provided for by the terms of Grant DMR 89-20147, awarded by the National Science Foundation.

TECHNICAL FIELD

The present invention herein resides in the preparation of alignment layers on substrates used in liquid crystal devices without any mechanical treatment. Specifically, the present invention relates to a method which utilizes ultraviolet (UV) light exposure of a layer of ultraviolet sensitive material during its preparation as an alignment layer to provide superior mechanical and thermal stability.

BACKGROUND ART

In liquid crystal devices it is known that alignment layers are employed on the inner surfaces of opposed substrates to orient and provide a well-defined disposition of the optic axis of liquid crystal material between the substrates. The alignment layer is typically made up of a long chain polymeric material which is later subjected to processes such as mechanical rubbing or ultraviolet exposure to alter the surface properties.

There are four generally accepted techniques for forming an alignment layer on the substrate of a liquid crystal device. Commonly used methods are rubbing or photo-alignment of organic/polymer films, and evaporation of inorganic materials. Although each method is capable of aligning the liquid crystal material, each method has particular drawbacks.

The most commercially used method of forming an alignment layer is the rubbing method. In this method, for example, a polyamic acid is spin-coated or otherwise deposited on a substrate and then imidized by subjecting it to two heat treatments (soft and hard bake) cycles forming a polyimide (PI) film. After an appropriate cooling period, the PI film is rubbed by a cloth, such as velvet, in a uniform singular direction. This orients the liquid crystal material that later comes in contact with the rubbed surface, along the rubbing direction. Unfortunately, this method can cause mechanical damage and generate electrostatic charges, both of which adversely affect liquid crystal displays that employ thin-film transistors. This method also generates dust from the cloth and PI which may adversely contaminate the liquid crystal material.

Another method of alignment is where the polyamic acid is disposed on the substrate and polymerized (imidized), as in the above method, resulting in a PI film. Next, after imidization, a linearly polarized ultraviolet light is projected onto the surface of the substrate to form the desired molecular alignment. The UV radiation anisotropically photo-dissociates photosensitive bonds in the PI including those in the imide ring. This selectively reduces the polarizability of PI molecules and changes the surface properties and morphology. Unfortunately, this method has resulted in alignment layers with weak anchoring of liquid crystals and poor thermal and chemical stability. This method also requires costly multi-step processing. Yet another drawback of this method is that it only provides a limited charge holding ratio and less thermal stability when compared to the rubbing method.

A similar method of preparing an alignment layer which uses photo-sensitive polymers is also known. For example, photo-sensitive polymers such as poly(vinyl)4-methoxycinnamate (PVMC); poly(vinyl) cinnamate (PVC); and polysiloxanecinnamate films may be used to align liquid crystal material. These materials, when exposed to a linearly polarized ultraviolet light (LPUV), initiate a photo-reaction after evaporation of the solvent. This method causes bonding and resultant orientation of the side chain molecules' axes uniaxially in a direction determined by the direction of linear polarization. However, this process does not chemically fix the orientation of the molecules and the alignment is reversible with exposure to normally occurring ultraviolet light. Moreover, the chemical composition of the materials is lost over time. As such, this process does not provide an alignment layer with a fixed, stable orientation of liquid crystal material later disposed thereon.

Yet another method for forming an alignment layer on a substrate is to deposit by evaporation inorganic materials such as $SiO_x$, MgO, etc., onto the surface of the substrate at various incidence angles. This forms an alignment layer which physically orients the director of the liquid crystal in the desired direction with or without a pre-tilt. However, this cumbersome method has been found difficult to use in a manufacturing process.

In light of the foregoing, it is evident there is a need in the art for a non-contacting method of forming an alignment layer for substrates used in liquid crystal devices. Moreover, there is need for a method which provides the desired alignment direction with chemical and thermal stability and improved anchoring strength and which utilizes a simpler, low cost, dust-free, and electrostatic charge free manufacturing process.

DISCLOSURE OF INVENTION

A first aspect of the present invention is to provide a method of preparing an alignment layer using in-situ ultraviolet exposure during polymerization. This is different than known methods in which UV exposure is a step after the polymerization is completed.

Another aspect of the present invention is to provide a glass or plastic substrate and dispose thereon a solution of a UV sensitive polymerizable (cross-linkable) material, such as polyamic acid, and a solvent, or a solution of a cross-linkable resin and a curing agent which may be provided with a solvent.

Yet another aspect of the present invention, as above, is to evaporate the solvent, such as by pre-baking, so as to leave a layer of polymerizable material (prepolymer) on the substrate.

A further aspect of the present invention, as above, is to position a linear ultraviolet polarizer in a plane substantially parallel with and spaced apart from the plane of the substrate.

Yet a further aspect of the present invention, as above, is to position an ultraviolet light source so that it directs ultraviolet rays normal to the surface of the linear polarizer and the substrate to polymerize the prepolymer to form an alignment layer on the substrate.

An additional aspect of the present invention, as above, is to bake the substrate with the prepolymer disposed thereon while the ultraviolet rays are applied to the substrate.

Yet an additional aspect of the present invention, as above, is to angularly direct the ultraviolet light on to the substrate so as to form an alignment layer which provides a pre-tilt to liquid crystal material later disposed thereon.

Still an additional object of the present invention is to employ substrates with alignment layers manufactured according to the above methodology in a liquid crystal device.

Yet another aspect of the present invention is to employ masks prior to the application of the ultraviolet light for the purpose of generating multidomain liquid crystal cells.

The foregoing and other aspects of the present invention, which shall become apparent as the detailed description proceeds, are achieved by a method for in-situ reorientation of polymer segments in an alignment layer during polymerization, comprising the steps of disposing a prepolymer, which undergoes polymerization absent ultraviolet light, on a substrate; and applying ultraviolet light to the substrate as said prepolymer is polymerized to simultaneously orient polymer segments to form an alignment layer on the substrate.

Other aspects of the present invention are attained by a non-contacting method of forming an alignment layer on a substrate used in a liquid crystal display, comprising the steps of cleaning a substrate surface; disposing a solution having a prepolymer, which undergoes polymerization absent ultraviolet light, and a solvent on the substrate surface; evaporating the solvent; positioning an ultraviolet light source proximally near the substrate surface; positioning a polarizer between the ultraviolet light source and the substrate surface; and applying ultraviolet light from the ultraviolet light source through the polarizer onto the substrate surface as said prepolymer is polymerized to simultaneously orient polymer segments to form an alignment layer on the substrate.

Yet further aspects of the present invention are attained by a method for fabricating a liquid crystal display, comprising the steps of providing a first and a second substrate with electrode layers disposed on a surface of each substrate; disposing a prepolymer, which undergoes polymerization absent ultraviolet light, on at least one of the electrode layers; applying ultraviolet light as said prepolymer is polymerized to simultaneously re-orient polymer segments to form an alignment layer on the at least one electrode layer; positioning the first and the second substrates so that the electrode layers face one another; and disposing liquid crystal material between the substrates to form the liquid crystal display.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques, and methodology of the invention, reference should be made to the following detailed description and accompanying drawings wherein.

BEST MODE FOR CARRYING OUT THE INVENTION

Figure 1:
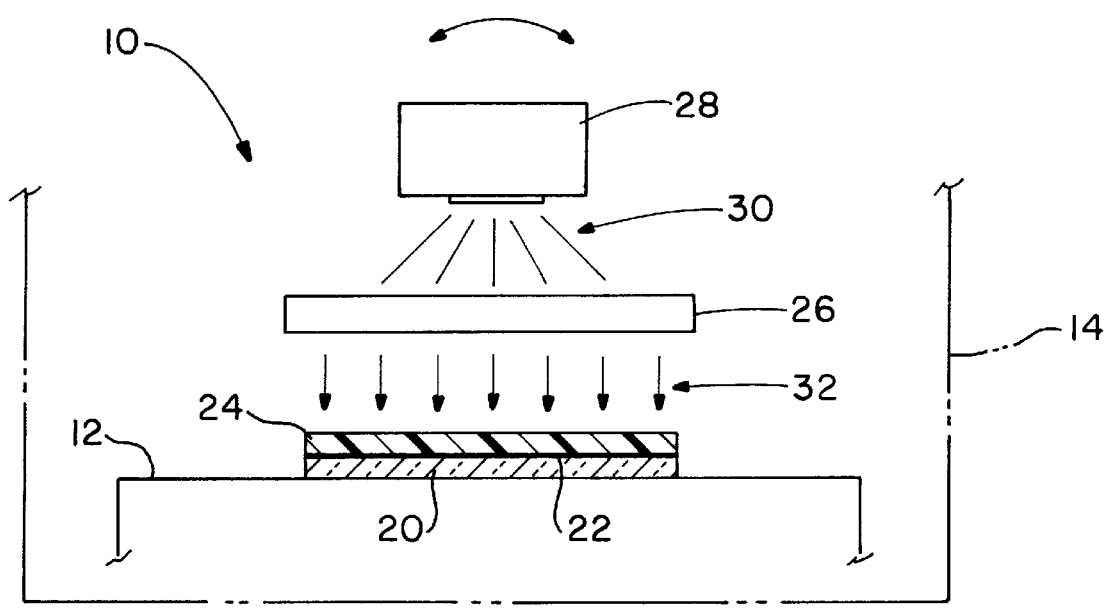
FIG. 1 is a schematic representation of a device used to implement the method according to the present invention.

Referring now to the drawings and in particular, to FIG. 1, it can be seen that a device for implementing the methodology of the present invention is designated generally by the numeral 10. The methodology presented herein may be used for the preparation of alignment layers used in information displays and electro-optic devices fabricated with liquid crystal material. The device 10 includes a platen 12, which may be heated in a chamber and/or provided in a conveyor belt configuration. The platen 12 may also be provided within an oven 14 for reasons which will become apparent as the detailed description proceeds.

A substrate 20, which may be glass or plastic, such as used in liquid crystal information displays and electro-optic devices, is provided. The side of the substrate 20 opposite the platen 12 may have disposed thereon an electrode 22, which is optically transmissive, such as indium-tin oxide. The electrode 22 is then cleaned.

A solution is prepared which contains at least a prepolymer and a solvent or the solution could comprise a resin and a curing agent. Any particular type of polymer may be used which is commonly used for preparing known alignment layers on substrates used in liquid crystal devices. The only requirement being that these polymers either be cross-linkable (polymerizable) by heat treatment or by mixing (chemical reaction) of the resin and curing agent, but not polymerizable by ultraviolet light. After polymerization, the polymer must also be UV sensitive. The solution is then disposed on the electrode 22 by spin-coating or other known method to form a layer of prepolymer 24. The substrate 12 is then positioned on the platen 12 with the layer 24 facing up. The platen 12 or the oven 14 may be energized to provide a pre-bake process to evaporate the solvent provided in the solution. Depending on the type of prepolymer or resin/curing agent used, the pre-bake step may not be required. No polymerization takes place during the pre-bake or evaporation step.

A linear polarizer 26 is then positioned above and apart from the substrate 20 in a plane substantially parallel thereto. The polarizer 26 may be mounted within the oven 14 or supported by clamping mechanisms at a predetermined distance from the platen 12. In order to facilitate the polymerization process, the oven 14 and/or the platen 12 may be heated to a predetermined temperature for a predetermined period of time.

An ultraviolet light source 28 is proximally positioned above the linear polarizer 26 and may be contained within or outside the oven 14. When energized, the ultraviolet light source 28 generates rays 30 which impinge upon the linear polarizer 26 which directs linearly polarized rays 32 onto the surface of the substrate 20 and in particular, onto the layer 24. Accordingly, the UV rays 30 and 32 function to selectively break photosensitive bonds in the prepolymer layer and to simultaneously align polymer segments of the polymer film along a direction perpendicular to the direction of the polarization of the linearly polarized rays 32. Although the light source 28 and polarizer 26 are shown positioned above the substrate 12, it will be appreciated that the benefits of the present invention may be attained by positioning these elements below the substrate 12 opposite the disposed prepolymer layer 24. In this instance, the substrate 12 would need to be suspended or supported by an optically neutral substrate.

The direction of polarization and the direction of incidence of UV light rays could also be adjusted by rotating the polarizer and the source of UV. Alternatively, the substrate surface could be tilted with respect to the direction of the incidence. Exposure at angles different from normal are needed to obtain a finite molecular pre-tilt for liquid crystal molecules.

EXAMPLE

A liquid crystal cell according to the above steps of providing an alignment layer was manufactured using Nissan SE610 PI and nematic LC E7 from British Drug House. Prior to imidization (polymerization)., the prepolymer, such as polyamic acid (PAA), is mixed with Nissan 810 solvent (NMP+Butyl Cellosolve mixture). Of course, other thermally or chemically cross-linkable prepolymer materials and mesophases may be used. In this particular example, a glass substrate was employed. The substrate was rinsed with isopropyl alcohol and dried thoroughly on a 120° C. hot plate. The material, in solution form, is spin-coated on to the substrate. The spinning is typically 3000 revolutions per minute for about 30 seconds. A soft or pre-baking operation exposes the spin-coated substrate to a temperature of about 100° C. for about 10 minutes to remove any remaining solvent.

Figure 2:
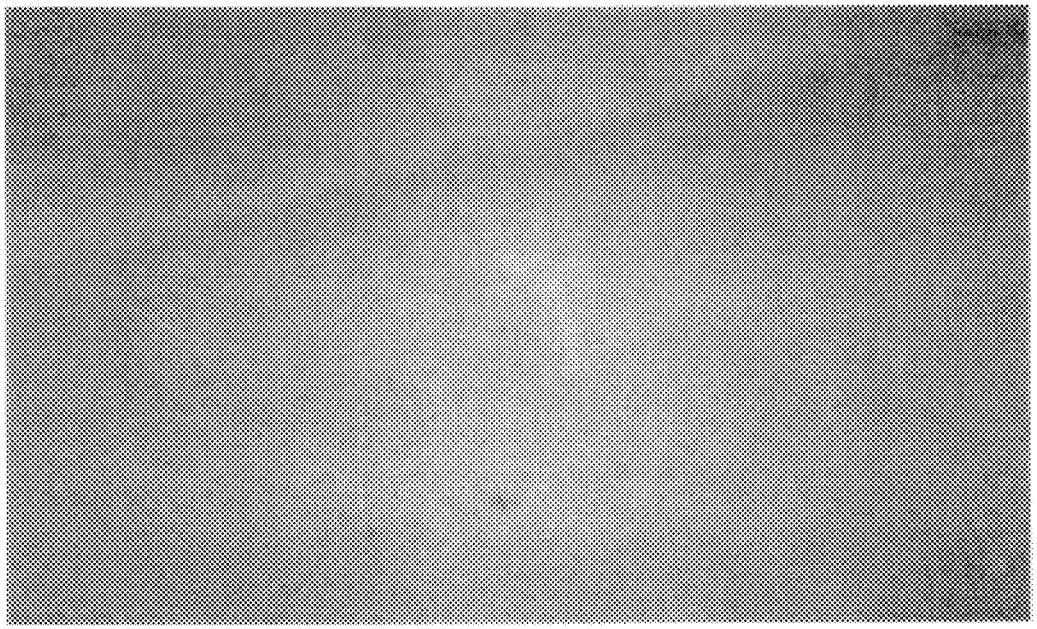
FIG. 2 is a microphotograph of a display utilizing alignment methods of the present invention showing uniform alignment.

FIG. 2 presents an optical microscopy texture after fabrication using the method of the present invention, that is, simultaneous exposure of ultraviolet light and heat treatment to imidize the prepolymer layer 24. In this step, the ultraviolet light source is energized while a hard-baking step exposes the spin-coated substrate to a temperature of about 250° C. for about 1 hour. While baking causes the imidization (polymerization), simultaneous application of the ultraviolet light selectively breaks or prevents the formation of chemical bonds in selected directions and aligns segments of PI along the direction substantially perpendicular to the polarization. The liquid crystal molecules align along this perpendicular direction when disposed on the layer 24.

Figure 3:
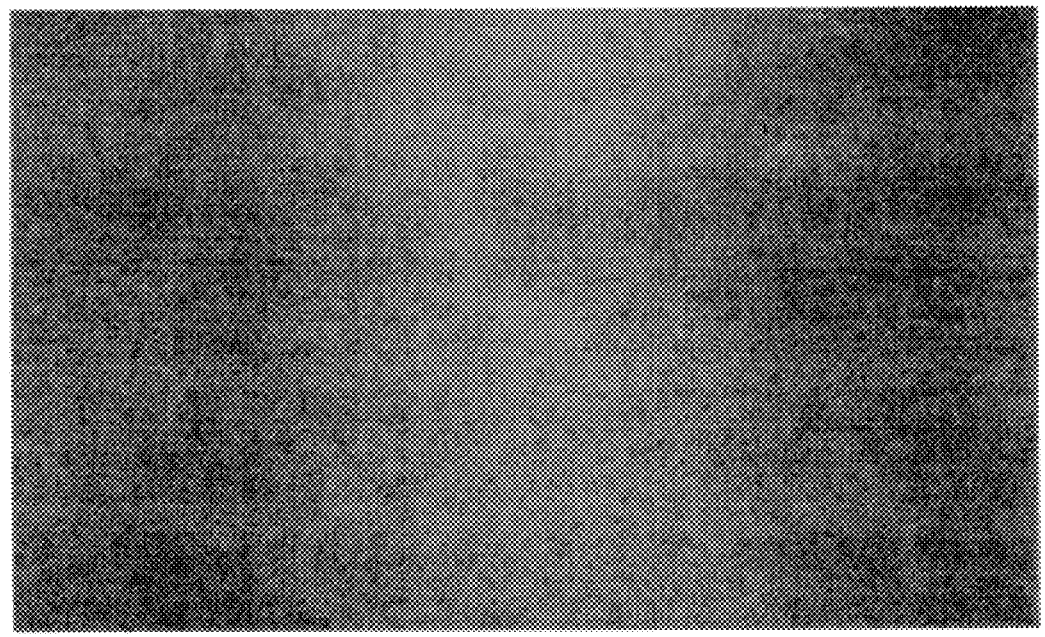
FIG. 3 is a microphotograph of a display utilizing a known method of preparing an alignment layer.

FIG. 3 presents a microscopic texture of a cell prepared with a known method wherein the PI film is exposed to ultraviolet light after the imidization of a polyamic acid has been completed.

Although FIGS. 2 and 3 are essentially the same in appearance at this point, it will be appreciated that liquid crystal displays are sensitive devices that are subjected to varied heat ranges and mechanical shocks during their life. Therefore, testing was conducted to determine the stability of the liquid crystal display devices and their operational parameters.

Figure 4:
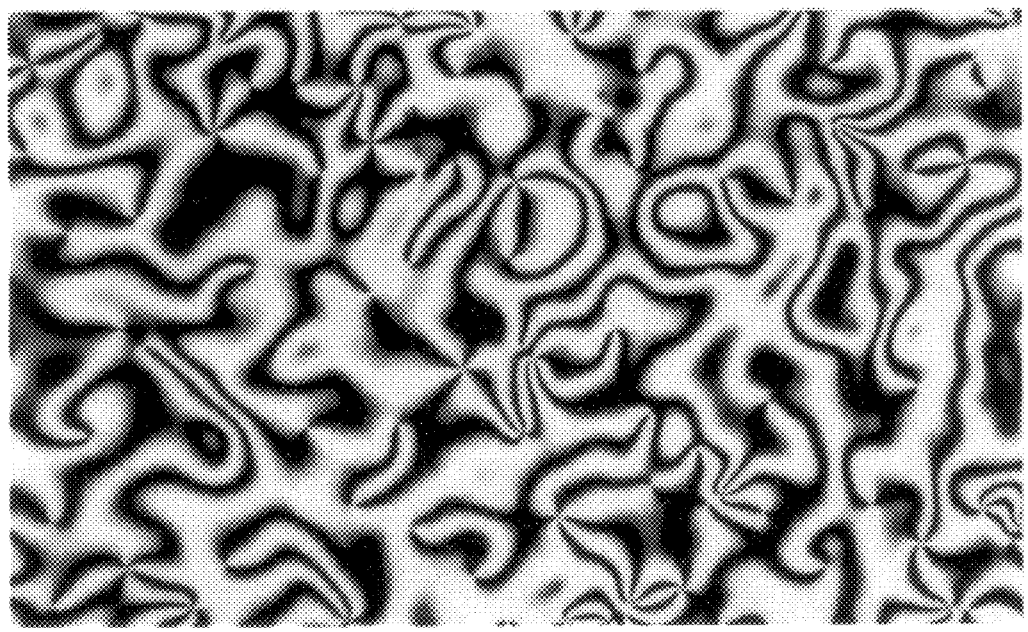
FIG. 4 is a microphotograph of a liquid crystal cell shown in FIG. 3 after 12 hours of thermal annealing at 100° C.

As seen in FIG. 4, the alignment texture of the liquid crystal cell, manufactured according to known manufacturing techniques, after an exposure to heat of 100° C. for 12 hours, reveals total loss of alignment and severe disinclinations in the liquid crystal alignment. It will be appreciated by those skilled in the art such a cell is unacceptable for use in information displays and electro-optical devices.

Figure 5:
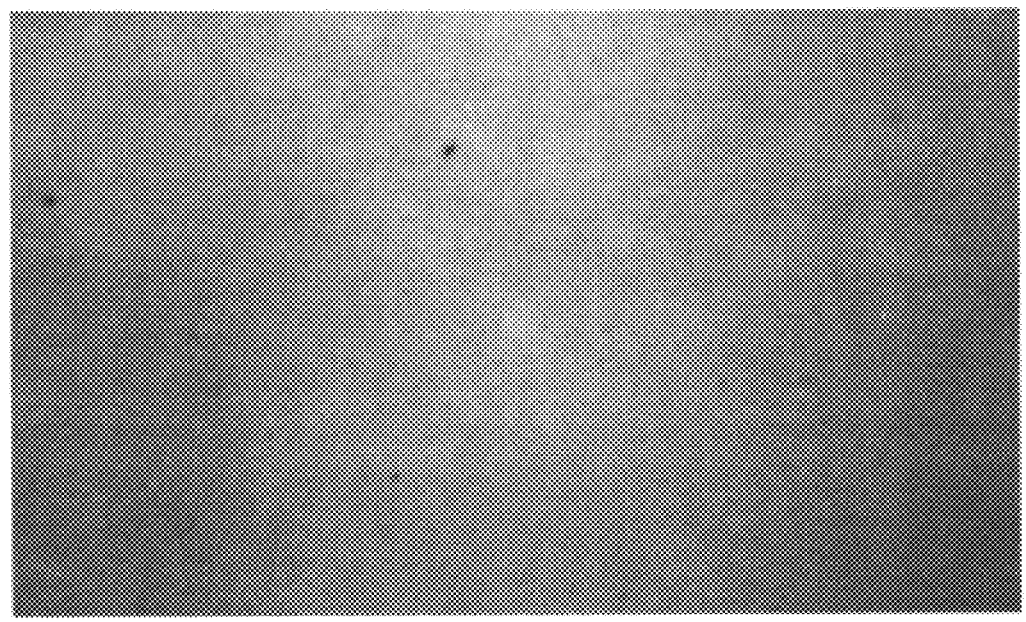
FIG. 5 is a microphotograph of a well-aligned liquid crystal texture made according to the present invention after 12 hours at thermal annealing at 100° C.

Referring now to FIG. 5, it can be seen that the cell made according to the present invention has been exposed to the same heat treatment as the cell of FIG. 4, that is, 100° C. heat for a period of 12 hours, and as is evident from the figure, the number of disinclinations is virtually eliminated. As such, thermal stability of the liquid crystal cell manufactured according to the disclosed methodology, is a significantly improved. It is theorized that the alignment mechanism is a result of a photochemical effect of the ultraviolet rays on PI. It is believed that this technique improves manufacturing efficiency by saving on the number of steps and the time it takes to prepare the alignment layer. This technique also improves the thermal stability and alignment quality of the liquid crystal device.

In another embodiment of the present invention, a cross-linkable resin and a curing agent (one of which must be ultraviolet sensitive) and a solvent, if needed, may be disposed on a substrate in a manner described above. Mixing of the resin and the curing agent will initiate a chemical reaction resulting in polymerization (cross-linking). Since this reaction could take anywhere between several minutes to 24 hours, simultaneous application of linearly polarized light until polymerization is complete will provide a cell with alignment layers similar to the one shown in FIGS. 2 and 5. The use of the oven 14 may be required to accelerate the polymerization reaction.

The present invention is also capable of producing alignment layers with pre-tilt angles by angularly directing the ultraviolet light source 28 so that the linearly polarized rays 32 impinge upon the surface of the substrate 20 at a desired angle. Alternatively, the angular disposition of the substrate may be adjusted to create the desired pre-tilt angle in the alignment layer. Thus, a repeatable and effective method for imparting a pre-tilt angle on an alignment layer is also provided.

If desired, a multi-domain alignment layer may be prepared by covering selected portions of the substrate prior to polymerization. Linearly polarized light is then applied to the substrate for a predetermined period of time. Afterwards, the mask is removed and a different orientation of linearly polarized ultraviolet light and different angle of incidence is applied for another predetermined period of time to the layer 24. If needed, a second mask may be provided over the portion of the alignment layer 24 previously exposed to UV light. Alternatively, a different orientation may be imparted by combining rubbing and the UV exposure method described herein. Moreover, by using various masking techniques in conjunction with the application of linearly polarized ultraviolet light, four domain cells can be created. And if desired, each domain can be provided with a desired pre-tilt angle by adjusting the direction of polarization and the angle of incidence of the ultraviolet light.

It will be appreciated by those skilled in the art that the advantages of the present invention are numerous. First, it is believed that polyamide of all forms and other ultraviolet sensitive and thermally polymerizable polymer films may be employed in the present invention. It is further theorized that different baking temperature ranges and exposure times of the ultraviolet light will vary according to the type of polymer used in the alignment layer and the specific alignment desired. Accordingly, the present method may be employed with nematic, ferroelectric, and anti-ferroelectric liquid crystal materials. It is theorized that it also may be used with polymer dispersed liquid crystal materials, discotics, and lyotropic materials.

Accordingly, the use of the present invention results in fewer steps in fabrication of a liquid crystal cell, thus resulting in a less expensive and faster manufacturing process. Yet another advantage of the present invention is that no rubbing is required which eliminates the possible mechanical damage or static charge that might damage or contaminate the device. It will also be appreciated that a device made with the claimed methodology is a stable structure and can withstand thermal shocks much better than post-polymerization ultraviolet treatment. Still another advantage of the present invention is that the pre-tilt of the alignment layer is easily controlled. This method also facilitates the ease with which multi-domain textures can be fabricated and allows for controllable or variable alignment with subsequent ultraviolet treatment.

While the preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. A method for in-situ reorientation of polymer segments in an alignment layer during polymerization, comprising the steps of:
   disposing a prepolymer, which undergoes polymerization absent the application of ultraviolet light, on a substrate; and
   simultaneously applying ultraviolet light to said substrate while initiating polymerization of said prepolymer, wherein the ultraviolet light orients the polymer segments as they are polymerized by means other than ultraviolet light to form an alignment layer on said substrate.

2. The method according to claim 1, further comprising the step of:
   disposing a linear polarizer between said ultraviolet light source and said substrate.

3. The method according to claim 2, further comprising the step of:
   pre-baking said substrate with said prepolymer disposed thereon immediately after said disposing step to evaporate any solvent associated with said prepolymer.

4. The method according to claim 2, further comprising the step of:
   angularly directing said ultraviolet light onto said substrate.

5. The method according to claim 4, further comprising the steps of:
   baking said substrate with said prepolymer disposed thereon to initiate polymerization while said ultraviolet light is applied thereto; and
   directing said ultraviolet light at an angle other than normal to said substrate so that the alignment layer imparts a pre-tilt angle to any liquid crystal material later disposed thereon.

6. The method according to claim 2, further comprising the step of:
   masking a portion of said substrate prior to said applying ultraviolet light step to form said substrate with first domains oriented in one direction.

7. The method according to claim 6, further comprising the step of:
   removing said mask; and
   forming said substrate with second domains oriented in another direction.

8. A The method according to claim 2, wherein said prepolymer comprises polyamic acid.

9. The method according to claim 1, further comprising the step of:
   baking said substrate with said prepolymer disposed thereon to initiate polymerization while said ultraviolet light is applied thereto.

10. The method according to claim 1, wherein said prepolymer comprises a resin and a curing agent and wherein mixing of said resin and said curing agent initiates polymerization.

11. A non-contacting method of forming an alignment layer on a substrate used in a liquid crystal display, comprising the steps of:
    cleaning a substrate surface;
    disposing a solution having a prepolymer, which undergoes polymerization absent the application of ultraviolet light, and a solvent on said substrate surface;
    evaporating said solvent by pre-baking;
    positioning an ultraviolet light source proximally near said substrate surface;
    positioning a polarizer between said ultraviolet light source and said substrate surface; and
    applying ultraviolet light from said ultraviolet light source through said polarizer onto said substrate surface while initiating polymerization wherein the ultraviolet light simultaneously orients the polymer segments as they are polymerized by means other than ultraviolet light to form an alignment layer on said substrate.

12. The non-contacting method according to claim 11, further comprising the step of:
    positioning either said substrate surface or said ultraviolet light source so that said ultraviolet light is directed at an angle other than normal to said substrate surface.

13. The non-contacting method according to claim 11, further comprising the step of:
    applying heat to said substrate surface to initiate polymerization while the ultraviolet light is applied.

14. The non-contacting method according to claim 11, wherein said prepolymer comprises a resin and a curing agent, the method further comprising the step of:
    mixing said resin and said curing agent to initiate polymerization while ultraviolet light is applied.

15. A method for fabricating a liquid crystal display, comprising the steps of:
    providing a first and a second substrate with electrode layers disposed on a surface of each said substrate;
    disposing a prepolymer, which undergoes polymerization absent the application of ultraviolet light, on at least one of the electrode layers;

simultaneously applying ultraviolet light while initiating polymerization of said prepolymer, wherein the ultraviolet light molecularly re-orients the polymer segments as they are polymerized by means other than ultraviolet light to form an alignment layer on the at least one electrode layer;

positioning said first and said second substrates so that said electrode layers face one another; and disposing liquid crystal material between the substrates to form the liquid crystal display.

16. The method according to claim 15, further comprising the step of:

positioning a linear polarizer between an ultraviolet light source and said substrate.

17. The method according to claim 16, further comprising the step of:

polymerizing the prepolymer disposed on said substrate by baking while said ultraviolet light is applied thereto.

18. The method according to claim 15, further comprising the step of:

masking a portion of said prepolymer prior to said applying ultraviolet light step to form said substrate with first domains oriented in one direction.

19. The method according to claim 18, further comprising the step of:

removing said mask after said applying step; and forming at least one more additional domain oriented in at least a different direction.

20. The method according to claim 15, wherein said prepolymer comprises a resin and a curing agent, the method further comprising the step of:

mixing said resin and said curing agent to initiate polymerization while ultraviolet light is applied.

* * * * *